United States Patent Office 2,848,840
Patented Aug. 26, 1958

2,848,840
AGRICULTURAL SOIL TREATMENT WITH GRANULATED FOAMED RUBBER LATEX

Chester Henry O'Brien and Norman Lewis O'Brien, Somerset, Mass.

No Drawing. Application September 27, 1954
Serial No. 458,712

2 Claims. (Cl. 47—1)

This invention relates to granulated foamed rubber latex and more particularly to the method and means of mixing and applying granulated foamed rubber latex to the soil to stimulate plant growth.

One of the objects of the present invention is to apply granulated foamed rubber latex to the soil to provide aeration of the soil.

Another object of the present invention is to mix granulated foam rubber latex with the soil as an additive to make the soil resilient and moisture retaining.

And still another object of the present invention is to provide granulated foamed rubber latex which has been treated with a liquid fertilizer as an additive to the soil which will surround the roots of plants and gradually release fertilizer to the roots as the granulated sponge rubber latex releases moisture to the roots.

Other objects of this invention will be pointed out in part and become apparent in part in the following specification and claims.

This application is a continuation-in-part of application Serial No. 384,518 filed October 6, 1953 (now abandoned) as to all matter common to that application and the present application.

The present invention differs from the prior art in that heretofore a strip or mattress of sponge rubber was laid on the surface of the soil or was buried in the soil. In either case an aggregation was accomplished between the sponge rubber and the soil. There was no integral mixture of the soil with the sponge rubber. The sponge rubber strip retained the water or liquid fertilizer in the same way that a sponge used to moisten the glue on an envelope flap retains its moisture.

The present granulated foamed rubber latex mixes with the soil as an addition to the soil and in so doing treats the soil so that a new combination is produced. The result is a soft, aerated, moisture retaining soil conducive to stimulated plant growth.

The terms "latex sponge rubber, foamed rubber latex and sponge rubber latex" are synonymous and are used to describe the product produced by the methods described in the book "Latex in Industry" by Noble, published by Rubber Age (N. Y.) 2nd edition, 1953, pages 603 through 613.

In proceeding with this invention, foamed rubber latex is granulated and mixed with soil as an additive. Foamed rubber latex has the physical characteristic of contracting when absorbing moisture and expanding when giving off moisture or drying. It is to be observed that most material expands when absorbing water and contracts as it dries.

Thus it will be observed that when granulated foamed rubber latex is mixed with the soil, the soil does not become hard so as to allow water to run off the surface of the soil. Rather the soil remains spongy and becomes more so as the granulated foamed rubber latex releases water. Thus the soil absorbs more water than it would if the soil had a hard crust. As the granulated sponge rubber latex gradually gives off moisture to the soil, thereby expanding, the soil is aerated. It is needless to enlarge on this desirable condition to the soil.

The present invention teaches a method of and means for supplying plant roots with a soil mixed with granulated foamed rubber latex, so that the plant root system will greatly enlarge itself in area because the soil upon which the root system feeds is favorably soft, moist and aerated. Thus an improved degree of plant development is attained.

The soil mixed with granulated foamed rubber latex in proportion of 10% to 50% may be used as a new type of growing bed or as a mulch around the base of plants and trees.

The present invention contemplates the use of liquid fertilizer which may be accomplished by allowing the granulated foamed rubber latex to absorb the liquid fertilizer which is then treated so that the fertilizer remains in the cells as the liquid evaporates. As moisture penetrates the granulated foamed rubber latex and the soil with which it is mixed, a certain proportion of the fertilizer is gradually released to the soil. In the same way insecticides of various types may be carried by the granulated foamed rubber latex to prevent the ground from becoming contaminated by pests.

Having thus described our invention what we claim is:

1. Agricultural soil for the promotion of plant life in the soil comprising coarsely granulated foamed rubber latex mixed with natural soil in proportion of 10% to 50% to enable the granulated foamed rubber latex to exercise its inherent characteristics of contracting when wet to absorb surplus moisture in the soil and to expand when drying out to give up the water stored in the granulated foamed rubber latex cells so as to aerate the soil and thereby condition the soil to absorb moisture when moisture is applied to the soil and thereby prevent water run-off.

2. Agricultural soil for the promotion of plant life in the soil comprising coarsely granulated foamed rubber latex mixed with natural soil in a proportion to provide a desired water content in said soil, the foamed rubber latex exercising its inherent characteristics of contracting when wet and expanding when drying out to aerate the soil and condition the soil to absorb moisture and prevent water run off, a layer of soil applied above the coarsely granulated foamed rubber latex to prevent sunlight from directly contacting the coarsely granulated foamed rubber latex and thereby prevent disintegration of said coarsely granulated foamed rubber latex.

References Cited in the file of this patent
UNITED STATES PATENTS

| | | |
|---|---|---|
| 1,121,324 | Black | Dec. 15, 1914 |
| 1,140,437 | Black | May 25, 1915 |
| 1,870,110 | Hall | Aug. 2, 1932 |
| 1,882,377 | Whittelsey | Oct. 11, 1932 |
| 1,931,248 | Bryant | Oct. 17, 1933 |
| 2,023,270 | Fischer | Dec. 3, 1935 |
| 2,203,274 | Anderson | June 4, 1940 |
| 2,342,588 | Larkin | Feb. 22, 1944 |
| 2,351,256 | Fischer | June 13, 1944 |

OTHER REFERENCES

Publication: "Latex in Industry" (Noble), published by Rubber Age (N. Y.), 2nd edition, 1953. Pages 603 through 613.